L. L. KNOX.
REGENERATIVE FURNACE.
APPLICATION FILED APR. 17, 1911.
1,070,486.
Patented Aug. 19, 1913.
3 SHEETS—SHEET 2.
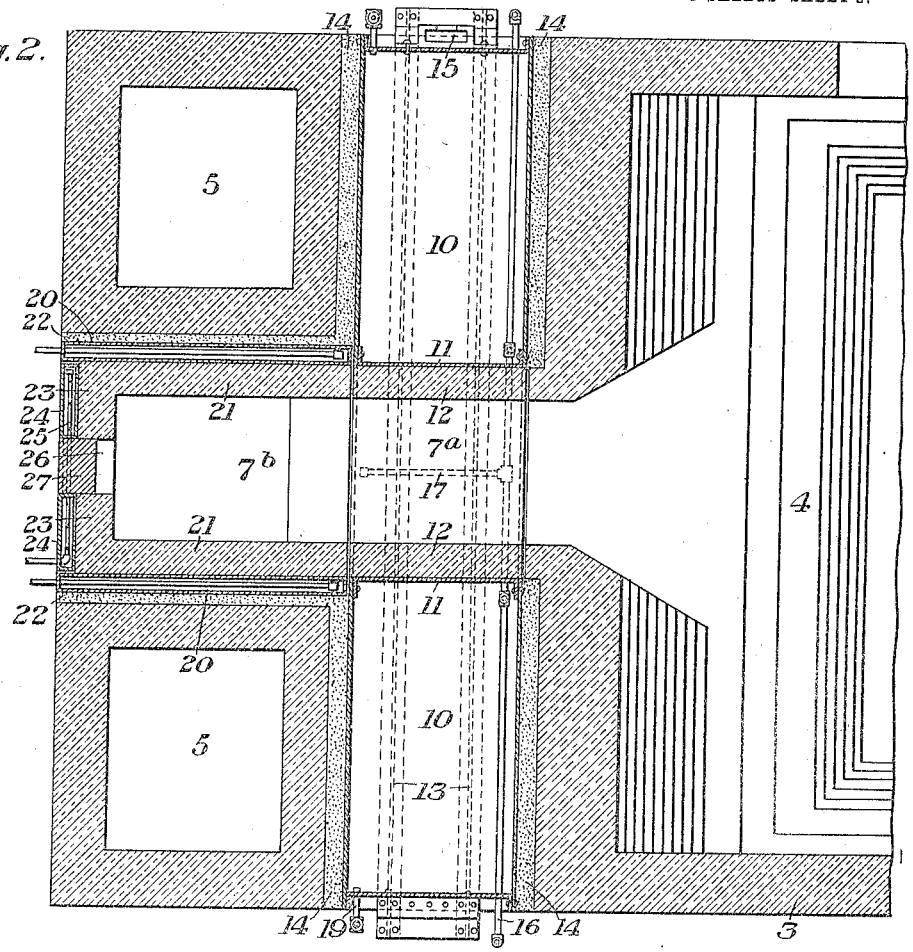
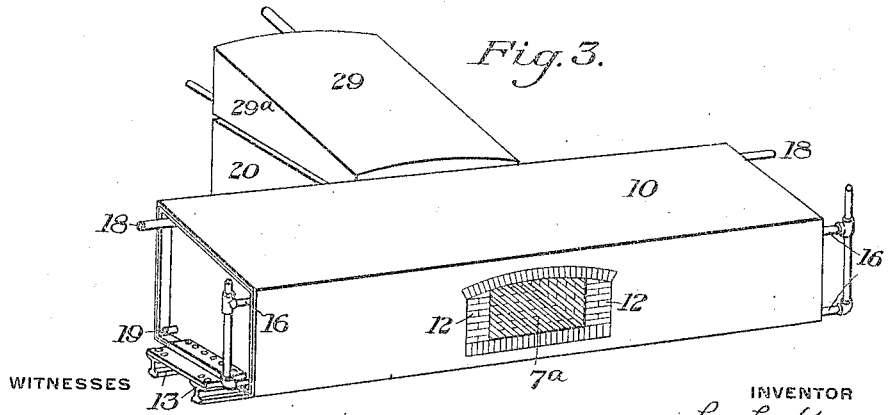
WITNESSES
R. A. Balderson
Walter Tamaris
INVENTOR
L. L. Knox
by Bakewell, Byrnes & Parmelee
his Attys.

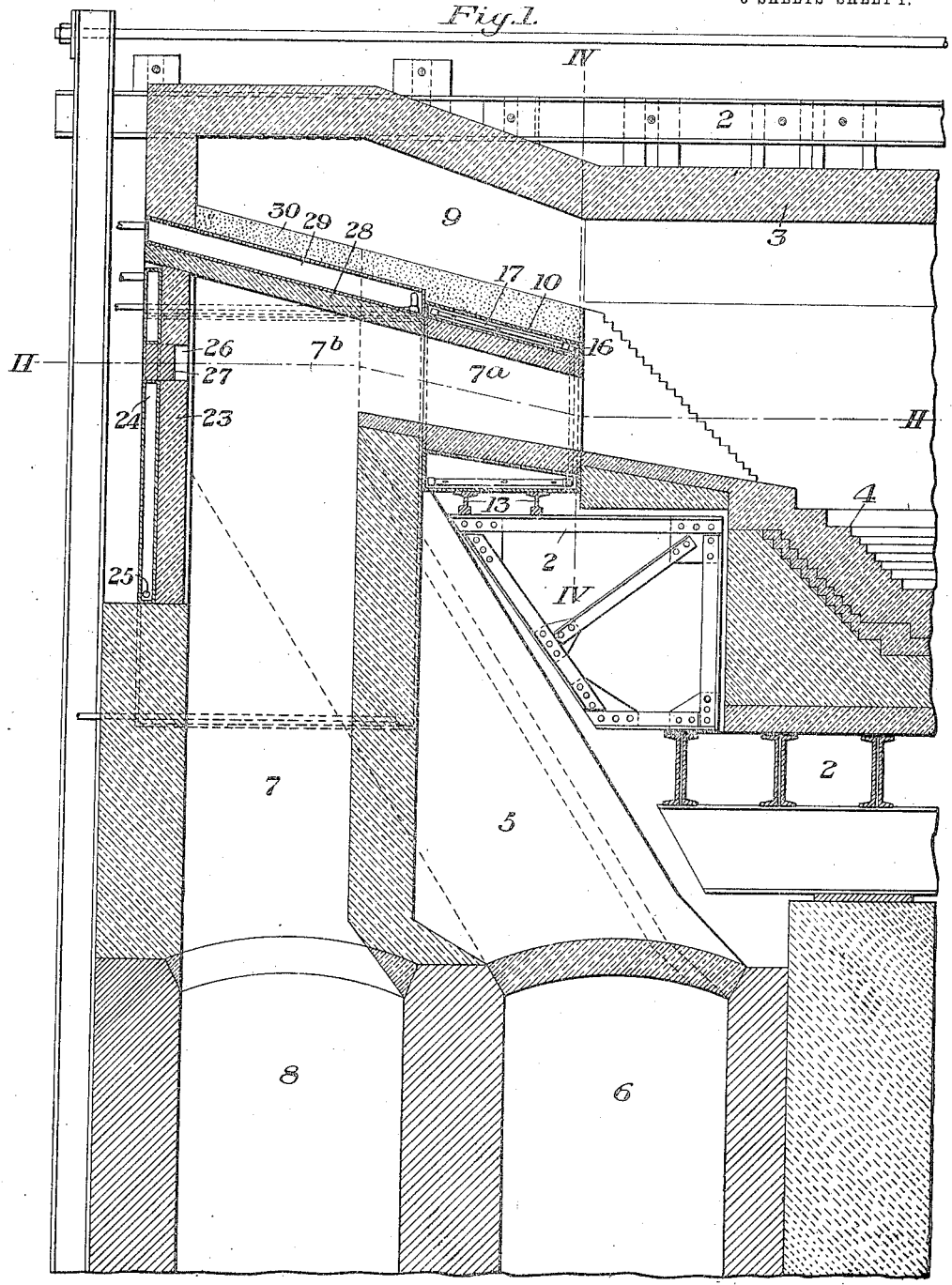

L. L. KNOX.
REGENERATIVE FURNACE.
APPLICATION FILED APR. 17, 1911.

1,070,486.

Patented Aug. 19, 1913.

3 SHEETS—SHEET 3.

WITNESSES
R A Balderson
Walter Jameson

INVENTOR
L. L. Knox,
by Bakewell, Byrnes Parmelee,
his Attys

BEST AVAILABLE COPY

UNITED STATES PATENT OFFICE.

LUTHER L. KNOX, OF AVALON, PENNSYLVANIA, ASSIGNOR TO THE KNOX PRESSED & WELDED STEEL COMPANY, OF NILES, OHIO, A CORPORATION OF OHIO.

REGENERATIVE FURNACE.

1,070,486. Specification of Letters Patent. Patented Aug. 19, 1913.

Application filed April 17, 1911. Serial No. 621,725.

*To all whom it may concern:*

Be it known that I, LUTHER L. KNOX, of Avalon, Allegheny county, Pennsylvania, have invented a new and useful Improvement in Regenerative Furnaces, of which the following is a full, clear, and exact description, reference being had to the accompanying drawings, forming part of this specification, in which—

Figure 4:
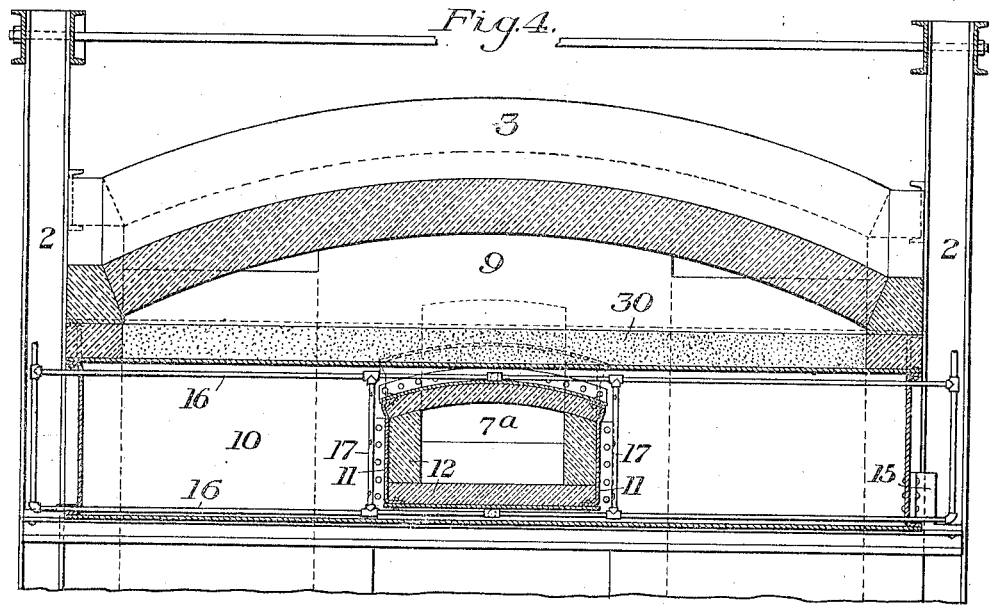
Figure 5:
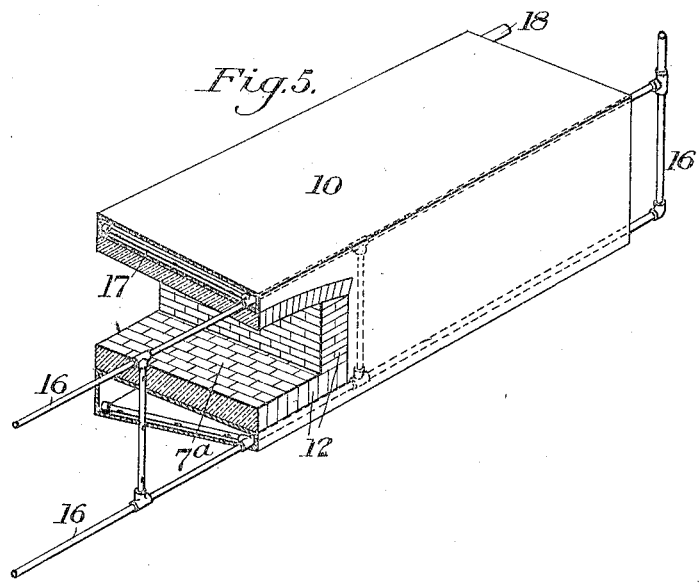

Figure 1 is a vertical section of one end of a regenerative open hearth furnace embodying my invention; Fig. 2 is a section on the line II—II of Fig. 1; Fig. 3 is a perspective view showing the port-forming parts; Fig. 4 is a section on the line IV—IV of Fig. 1; and Fig. 5 is a sectional perspective view showing the construction of the gas port and cooler.

My invention has relation to regenerative furnaces, and is designed to provide a novel construction of the gas port and of the arch separating the gas and air ports, whereby the parts may be effectively cooled, and whereby the parts most subject to destruction can be readily removed and replaced.

The nature of my invention will be best understood by reference to the accompanying drawings, in which I have shown the preferred embodiment thereof, and which will now be described, it being premised, however, that various changes may be made in the details of construction and arrangement of the parts by those skilled in the art without departing from the spirit and scope of my invention as defined in the appended claims.

In the drawings, the numeral 2 designates the frame of the furnace, 3 the refractory wall thereof, and 4 a portion of the furnace hearth.

5 designates the air uptakes, which lead upwardly from the usual slag pockets, one of which is indicated at 6, and which have the usual regenerator connections.

7 is the gas uptake leading upwardly from the slag pocket 8, and arranged centrally between the air uptakes, the latter being inclined as shown in Fig. 1.

9 designates the air port, with which the uptakes 5 communicate at their upper ends, and 7ᵃ is the gas port communicating with the gas uptake 7.

10 designates a cooling box, which is inserted transversely of the furnace, between the air and gas uptakes and the body of the furnace, as best shown in Fig. 2, extending the entire width of the furnace. This box 10 has a central opening extending entirely through it from front to rear, this opening forming the inner end portion 7ᵃ of the gas port. While I have shown this opening as being surrounded on all four sides by a water-containing space, this is not essential, as its bottom portion may be otherwise formed. The side, roof and bottom walls of this port opening are provided with a refractory lining 12. The box is shown as supported upon the rails 13 resting upon the framework 2 of the furnace, and the entire box is capable of being withdrawn from one side of the furnace, carrying with it the gas port. The spaces between each side of the box and the adjacent walls of the air ports and the body of the furnace preferably have a filling 14 of sand or other suitable material. The box is also preferably provided at one end with means such as indicated at 15 for the engagement therewith of a suitable hook on the furnace charging apparatus in removing the box.

The two cooling compartments of the box 10 are connected over the roof arch of the port 7ᵃ, and also below the floor of the port if there is a water space provided below the bottom wall of said port. The entire box is designed to be kept filled with water, which may be supplied by any suitable arrangement of circulating pipes. In the drawings I have shown the box as having a plurality of longitudinally extending inlet pipes 16, provided with vertical and transversely extending spray branches 17, these spray branches being preferably located adjacent to the walls of the port 7ᵃ. The offtake connections for the box are shown at 18.

19 indicates a clean-out connection at the lower portion of the box.

The side walls of the upper portion of the gas uptake 7 are shown as protected by hollow coolers 20, which are inserted from the end of the furnace between the inner side walls of the air uptakes and the lateral walls 21 of the upper portion of the gas uptake. A filling of sand or other similar material, such as indicated at 22, may be placed between these coolers 20, and the side walls of the air uptakes. The outer wall or bulkhead 23 of the upper portion of the gas uptake is protected by a cooler 24 shown as having a spray pipe 25 therein. This cooler 24 is also shown as having a door 26 normally filled with a refractory block filling 27. The wall 23 is made separately removable, as indicated at 21. The gas uptake has the inward extension 7ᵇ at its upper end, which communicates with the gas port 7ᵃ. The roof of the uptake and its extension are formed by the refractory wall 28, having a removable cooler 29, which is inserted from the end of the furnace, and which can be readily removed therefrom. This cooler has the depending short side legs 29ᵃ which embrace the upper portion of the sides of the uptake and extension. A covering 30 of sand, or other suitable refractory material, is preferably placed over the cooler 29, and also over the top of the box 10, to form the floor of the port.

The advantages of my invention will be readily apparent. It provides means whereby the walls of the gas port may be efficiently and thoroughly cooled by a large body of cooling fluid, which is also in a position to cool the end walls of the furnace and the inner walls of the air uptakes. The upper portion of the gas uptake is also effectively cooled by the side coolers 20, the end cooler 24, and the arch cooler 29. All of these coolers may be readily removed and replaced whenever necessary.

While I have shown my invention as applied to but one end of the furnace, it will be understood that the construction at both ends is preferably the same. I do not, however, wish to limit myself to the precise construction and arrangement of the parts which I have described, since obviously the invention is applicable to furnaces differing somewhat in construction to the furnace illustrated, and which will require a corresponding change in the details of the construction and arrangement of the coolers.

What I claim is:—

1. A port-forming and cooling structure for regenerative furnaces, said structure comprising a hollow metal casing having a port opening extending through its central portion, and having an elongated lateral extension at each side of said opening, substantially as described.

2. A port-forming and cooling structure for regenerative furnaces, said structure comprising a hollow metal casing having a port opening extending through its central portion, and having an elongated lateral extension at each side of said opening, said extensions being interiorly connected by water passages or spaces adjacent to the port opening, substantially as described.

3. A port-forming and cooling structure for regenerative furnaces, said structure comprising a hollow metal casing having a port opening extending through its central portion, and having an elongated lateral extension at each side of said opening, each of said extensions being longer than the transverse width of the port opening, substantially as described.

4. A port-forming and cooling structure for regenerative furnaces, said structure comprising a hollow metal casing having a port opening extending through its central portion, and having an elongated lateral extension at each side of said opening, the structure also having means at the end thereof to be engaged by a removing device, substantially as described.

5. A port-forming and cooling structure for regenerative furnaces, comprising a hollow closed metal box having a port opening extending therethrough, the box having a length at right angles to the axis of said opening greater than the length of said opening in the direction of its axis, and greater than the vertical height of the box, and the box having water-circulating connections, substantially as described.

6. In a regenerative furnace having air and gas uptakes and air and gas ports, a port-forming and cooling structure, comprising a hollow box or casing extending transversely across the furnace and having an opening therethrough which forms the furnace or nose end of the gas port, the hollow end portion of the box being extended laterally between the air uptakes and the hearth portion of the furnace, substantially as described.

7. In a regenerative furnace having air and gas uptakes and air and gas ports, a port-forming and cooling structure, comprising a hollow box or casing extending transversely across the furnace and having an opening therethrough which forms the furnace or nose end of the gas port, the hollow end portion of the box being extended laterally between the air uptake and the hearth portion of the furnace, said box being insertible and removable through an opening at the side of the furnace, substantially as described.

8. In a regenerative furnace having air and gas uptakes and air and gas ports, a port-forming and cooling structure, comprising a hollow box or casing extending transversely across the furnace and having an opening therethrough which forms the furnace or nose end of the gas port, the hollow end portions of the box being extended laterally between the air uptakes and the hearth portion of the furnace, said box being insertible and removable through an opening at the side of the furnace, together with tracks upon which the structure is mounted for movement in inserting and removing it, substantially as described.

9. A port forming and cooling structure for regenerative furnaces, said structure comprising a hollow metal casing having an arched port opening extending through its central portion and having at each side of said central portion an elongated hollow lateral extension, said structure being seated in an opening formed between the gas and air uptakes and the body portion of the furnace; substantially as described.

10. A regenerative furnace having tracks extending transversely between the uptakes and the hearth portion of the furnace, and a port-forming and cooling structure mounted for movement on said tracks into and out of operative position through an opening at the side of the furnace, said structure comprising a transversely elongated hollow metal box or casing with a port-opening formed therethrough at substantially right angles to the length of the box, substantially as described.

11. A regenerative furnace having removable vertically arranged coolers intermediate the side walls of its gas and air uptakes, and a filling of loose refractory material adjacent to said coolers, substantially as described.

12. A regenerative furnace, having an opening extending transversely therethrough between the gas and air uptakes and its hearth portion, said opening being entirely below the roof structure of the furnace, and a hollow metal box removably inserted in said opening, said box having an opening therethrough in line with and forming a continuation of the furnace gas port and having its hollow end portions lying between the air uptakes and the hearth portion of the furnace, and connections for circulating a cooling medium through the box, substantially as described.

13. In a regenerative furnace having air and gas uptakes and air and gas ports, a port-forming and cooling structure, comprising a hollow box or casing extending transversely across the furnace and having an opening therethrough which forms the furnace or nose end of the gas port, the hollow end portion of the box being extended laterally between the air uptakes and the hearth portion of the furnace, and the gas port back of the said box having a cooler in its top wall or arch, substantially as described.

In testimony whereof, I have hereunto set my hand.

LUTHER L. KNOX.

Witnesses:
GEO. B. BLEMING,
R. M. CONWAY.